US007561107B2

(12) United States Patent
Al-Mahdawi

(10) Patent No.: US 7,561,107 B2
(45) Date of Patent: Jul. 14, 2009

(54) RFID DEVICE WITH MICROSTRIP ANTENNAS

(75) Inventor: Tareef Ibrahim Al-Mahdawi, San Jose, CA (US)

(73) Assignee: Intelleflex Corporation, San Jose, CA (US)

( * ) Notice: Subject to any disclaimer, the term of this patent is extended or adjusted under 35 U.S.C. 154(b) by 394 days.

(21) Appl. No.: 11/470,968

(22) Filed: Sep. 7, 2006

(65) Prior Publication Data

US 2008/0062044 A1 Mar. 13, 2008

(51) Int. Cl.

*H01Q 1/38* (2006.01)
*G08B 13/14* (2006.01)
*G06K 19/06* (2006.01)

(52) U.S. Cl. .............................. 343/700 MS; 343/846; 343/829; 340/572.1; 235/492

(58) Field of Classification Search ........... 343/700 MS
See application file for complete search history.

(56) References Cited

U.S. PATENT DOCUMENTS 5,557,293 A 9/1996 McCoy et al. ............... 343/867
5,652,595 A 7/1997 Ahrens et al. ............... 343/700
5,694,135 A 12/1997 Dikun et al. ................ 343/700
6,031,505 A 2/2000 Qi et al. ....................... 343/795
6,249,227 B1 6/2001 Brady et al. ............. 340/572.1
6,252,508 B1 6/2001 Vega et al. ............... 340/572.1
6,295,028 B1 9/2001 Jonsson et al. .............. 343/700
6,686,882 B2 2/2004 Petros et al. ................ 343/700
6,761,316 B2 7/2004 Bridgelall et al. ...... 235/462.46
2002/0139858 A1 10/2002 Bridgelall et al. ...... 235/462.46
2002/0158120 A1 10/2002 Zierolf ....................... 235/375
2004/0075616 A1 4/2004 Endo et al. .................. 343/895
2004/0090369 A1* 5/2004 McCarrick ........... 343/700 MS
2004/0188531 A1 9/2004 Gengel et al. ............... 235/491
2005/0087599 A1 4/2005 Ward et al. .................. 235/451
2005/0125093 A1 6/2005 Kikuchi et al. .............. 700/213
2005/0134460 A1 6/2005 Usami ...................... 340/572.7
2005/0168339 A1 8/2005 Arai et al. ................ 340/572.8
2005/0195083 A1 9/2005 Venture et al. ........... 340/572.1
2005/0197074 A1* 9/2005 Cullen et al. ............... 455/90.3
2008/0036673 A1* 2/2008 Yamagajo et al. ........... 343/793

* cited by examiner

*Primary Examiner*—Trinh V Dinh
(74) *Attorney, Agent, or Firm*—Zilka-Kotab, PC

(57) ABSTRACT

A Radio Frequency Identification (RFID) device such as an RFID tag according to one embodiment of the present invention includes first and second sides. A first microstrip antenna extends along the first side, the first microstrip antenna comprising a microstrip positioned towards the first side, a Radio Frequency-(RF-)reflective back plane, and a dielectric spacer positioned between the microstrip and the back plane. A second microstrip antenna extends along the second side, the second microstrip antenna comprising a microstrip positioned towards the second side, an RF-reflective back plane, and a dielectric spacer positioned between the microstrip and the back plane. The first and second microstrip antennas are each independently coupled to circuitry for receiving signals from the first and second microstrip antennas.

23 Claims, 3 Drawing Sheets

RFID DEVICE WITH MICROSTRIP ANTENNAS

FIELD OF THE INVENTION

The present invention relates to Radio Frequency Identification (RFID) systems and methods, and more particularly, this invention relates to RFID devices with microstrip antennas positioned on two sides thereof.

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scannner. This technology gained widespread adoption and near-universal acceptance with the designation of the Universal Product Code ("UPC")—a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sigh process that has inherent limitations in speed and reliability. In addition, the UPC bar codes only allow for manufacturer and product type information to be encoded into the barcode, not the unique item' serial number. The bar code on one milk carton is the same as every other, making it impossible to count objects or individually check expiration dates, much less find one particular carton of many.

Currently, retail items are marked with barcode labels. These printed labels have over 40 "standard" layouts, can be mis-printed, smeared, mis-positioned and mis-labeled. In transit, these outer labels are often damaged or lost. Upon receipt, the pallets typically have to be broken-down and each case scanned into an enterprise system. Error rates at each point in the supply chain have been 4-18% thus creating a billion dollar inventory visibility problem. However, Radio Frequency Identification (RFID) allows the physical layer of actual goods to automatically be tied into software applications, to provide accurate tracking.

The emerging RFID technology employs a Radio Frequency (RF) wireless link and ultra-small embedded computer chips, to over come these barcode limitations. RFID technology allows physical objects to be identified and tracked via these wireless "tags". It functions like a bar code that communicates to the reader automatically without needing manual line-of-sight scanning or singulation of the objects.

In the design of RF antennas, it is often desirable to achieve an antenna gain pattern that is independent of orientation in any direction, i.e., fully spherical in all three dimensions. Most single antenna designs suffer from attenuation in at least one direction. This usually results in greater difficulties during installations and reduced reliability over changing environmental conditions. Some solutions have included using multiple antenna and transceiver hardware systems to more completely cover all orientations of the desired signals. Such RFID tags usually have two antenna ports, with one antenna per port. This configuration is used for polarization. However, if the tag is lying flat on a table, both antennas become detuned, and the tag may lose the ability to communicate.

Therefore, it would be desirable to create an RF design that exhibits good gain characteristics while maintaining a fully omni directional (isotropic) pattern in free space, and which further does not become detuned when placed against a metal or dielectric surface.

In conjunction with the desire for orientation-independent functionality, it is also desirable to miniaturize the entire transceiver. However, miniaturization urges physical positioning of all of the electronic components near the antenna. The location of conducting elements within the field of the antenna has heretofore generally resulted in the antenna's characteristics being modified, usually in an undesirable fashion. This has been dealt with previously by simply accepting the degraded performance, or by physically separating the antenna from other conductive elements, resulting in an undesirably larger size.

What is therefore needed is a way to reduce physical size of the RF device while maintaining optimal antenna characteristics.

SUMMARY OF THE INVENTION

A Radio Frequency Identification (RFID) device such as an RFID tag according to one embodiment of the present invention includes first and second sides. A first microstrip antenna extends along the first side, the first microstrip antenna comprising a microstrip positioned towards the first side, a Radio Frequency—(RF-)reflective back plane, and a dielectric spacer positioned between the microstrip and the back plane. A second microstrip antenna extends along the second side, the second microstrip antenna comprising a microstrip positioned towards the second side, an RF-reflective back plane, and a dielectric spacer positioned between the microstrip and the back plane. The first and second microstrip antennas are each independently coupled to circuitry for receiving signals from the first and second microstrip antennas.

In one embodiment, the first and second sides lie along parallel planes. This allows each microstrip antenna to provide coverage of the half space facing the antenna. The combined pattern of the two antennas provides a desirable omnidirectional coverage in free space.

Preferably, the circuitry and any other components such as a battery, sensor, etc. are positioned between the backplanes of the microstrip antennas.

Also preferably, the backplane of the first microstrip antenna isolates the first antenna from an outgoing signal of the second antenna. The backplane of the first microstrip antenna may also isolate the second antenna from an outgoing signal of the first antenna. This is the effect of preventing one antenna from interfering with the other. In one embodiment, the backplanes of the microstrip antennas extend about to a periphery of the device. Each microstrip antenna may be a patch antenna.

In a preferred embodiment, the signals from the first and second microstrip antennas are not combined in RF. This allows the device to process incoming signals, even if one of the antennas becomes detuned, e.g., by placement against an RF-reflective surface. In one embodiment, the signals from the first and second microstrip antennas may be combined at baseband.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understand of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features descried herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Utilizing an RFID tag, and time may be tagged at a period when the initial properties of the item are known. For example, this first tagging of the time may correspond with the beginning of the manufacturing process, or may occur as an item is first packaged for delivery. Electronically tagging the item allows for subsequent electronic exchanges of information between the tagged item and a user, wherein a user may read information stored within the tag and may additionally write information to the tag.

Figure 1:
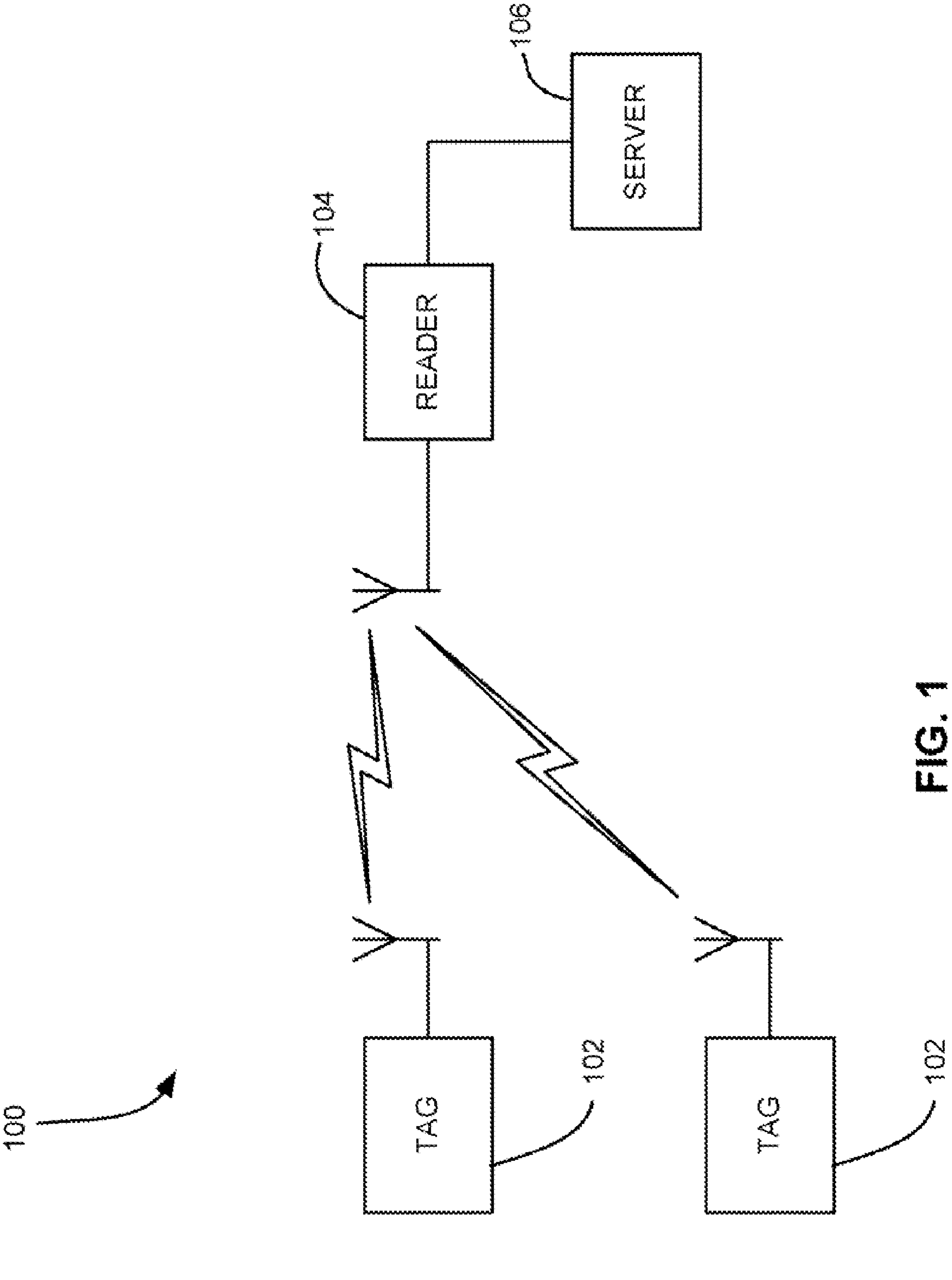
FIG. 1 is a system diagram of an RFID system according to one embodiment of the present invention.

As shown in FIG. 1, and RFID system 100 according to one embodiment of the present invention includes RFID tags 102, and interrogator or "reader" 104, and an optional server 106 or other backend system which may include databases containing information relating to RFID tags and/or tagged items. Each tag 102 may be coupled to an object. Each tag 102 includes a chip and an antenna. The chip includes a digital decoder needed to execute the computer commands that the tag 102 receives from the reader 104. The chip may also include a power supply circuit to extract and regulate power from the RF reader, a detector to decode signals from the reader, a backscatter modulator, a transmitter to send data back to the reader; anti-collision protocol circuits; and at least enough memory to store its unique identification code, e.g., Electronic Product Code (EPC).

The EPC is a simple, compact identifier that uniquely identifies objects (items, cases, pallets, locations, etc.) in the supply chain. The EPC is built around a basic hierarchical idea that can be used to express a wide variety of different, exiting numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each tag 102 may also store information about the time to which coupled, including but not limited to a name or type of item, serial number of the time, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases to not reside on the tag, but rather are linked to the tag through a unique identifier(s) or reference key(s).

Communication begins with a reader 104 sending out signals via radio wave to find a tag 102. When the radio wave hits the tag 102 and the tag 102 recognizes and responds to the reader's signal, the reader 104 decodes the data programmed into the tag 102. The information is then passed to a server 106 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Complaint tag classes are set forth below:

Class-1
Identify tags (RF user programmable, range ~3 mm)
Lowest cost
Class-2
Memory tags (20 but address space programmable at ~3 m range)
Security & privacy protection
Low cost
Class-3
Semi-passive gas (also called semi-active tags)
Battery tags (256 bits to 2M words)
Self-Powered Backscatter (internal clock, sensor interface support)
~100 meter range
Moderate cost
Class-4
Active tags
Active transmission (permits tag~speaks~first operating modes)
~30,000 meter range Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as semi-active or semi-passive), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal enables the tag permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds. One illustrative application of ultra high-frequency tags is automated toll collection on highways and interstates.

Figure 2:
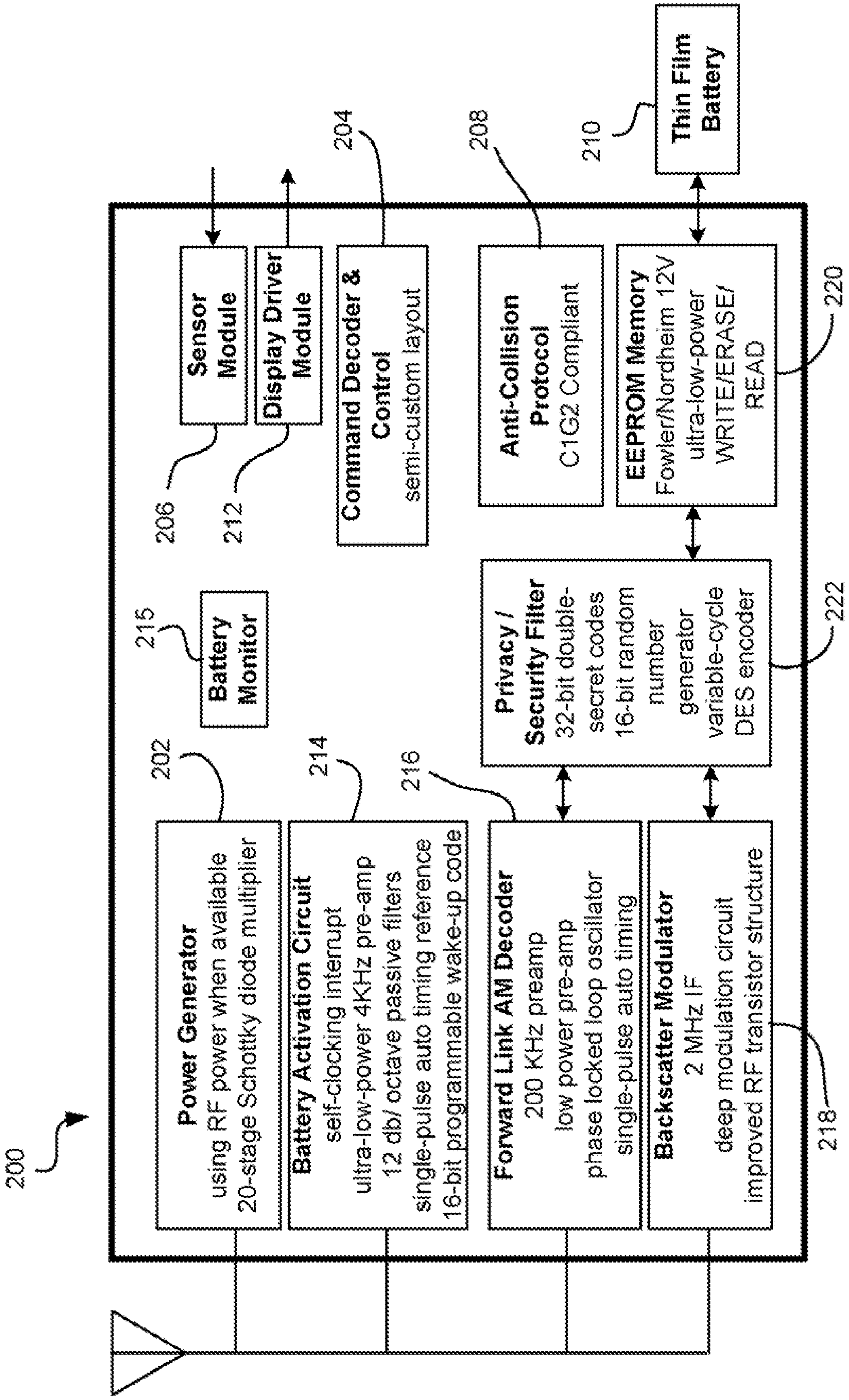
FIG. 2 is a system diagram for an integrated circuit (IC) chip for implementation in an RFID tag.

Embodiments of the present invention are preferably implemented in a Class-3 or higher Class chip, which typically contains the control circuitry for most if not all tag operations. FIG. 2 depicts a circuit layout of a Class-3 chip 200 and the various control circuitry according to an illustrative embodiment for implementation in and RFID tag. This Class-3 chip can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A battery activation circuit 214 is also present to act as a wake-up trigger. In brief, many portions of the chip 200 remain in hibernate state during periods of inactivity. A hibernate state may mean a low power state, or a no power state. The battery activation circuit 214 remains active and processes incoming signals to determine whether any of the signals contain an activate command. If one signal does contain a valid activate command, additional portions of the chip 200 are wakened from the hibernate state, and communication with the reader can commence. In one embodiment, the battery activation circuit 214 includes an ultra-low-power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one embodiment, a pure, Fowler-Nordheim direct-tunneling-through-oxide mechanism 220 is present to reduce both the WRITE and ERASE currents to about 2 μA/cell in the EEPROM memory array. Unlike any RFID tags built to date, this will permit designing of tags to operate at maximum range even when WRITE and ERASE operations are being performed. In other embodiments, the WRITE and ERASE currents may be higher or lower, depending on the type of memory used and its requirements.

The module 200 may also incorporate a highly-simplified, yet very effective, security encryption circuit 222. Other security schemes, secret handshakes with reader, etc. can be used.

Only six connection pads (not shown) are required for the illustrative chip 200 of FIG. 2 to function: Vdd to the battery, ground, plus two antenna leads to support multi-element omni-directional and isotropic antennas. Sensors to monitor temperature, shock, tampering, etc. can be added by appending an industry-standard $I^2C$ or SPI interface to the core chip.

It should be kept in mind that the present invention can be implemented using any type of tag, and the circuit 200 described above is presented as only one possible implementation.

Many types of devices can take advantage of the embodiments disclosed herein, including but not limited to RFID systems and other wireless devices/systems. To provide a context, and to aid in understanding the embodiments of the invention, much of the present description has been presented in terms of an RFID system such as that shown in FIG. 1. It should be kept in mind that this is done by way of example only, and the invention is not to be limited to RFID systems, as one skilled in the art will appreciate how to implement the teaching herein into electronics devices in hardware and/or software. In other words, the invention can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon. A computer readable medium can include any medium capable of storing computer code thereon for use by a computer, including optical media such as read only and write able CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

Figure 3A:
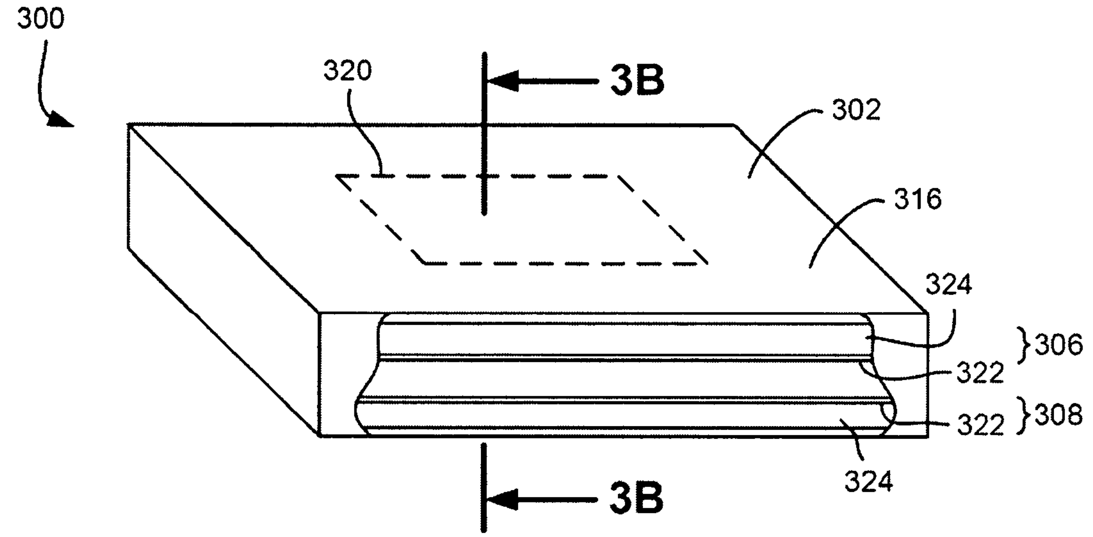
FIG. 3A is a partial breakaway perspective view of an RFID device according to one embodiment of the present invention.
Figure 3B:
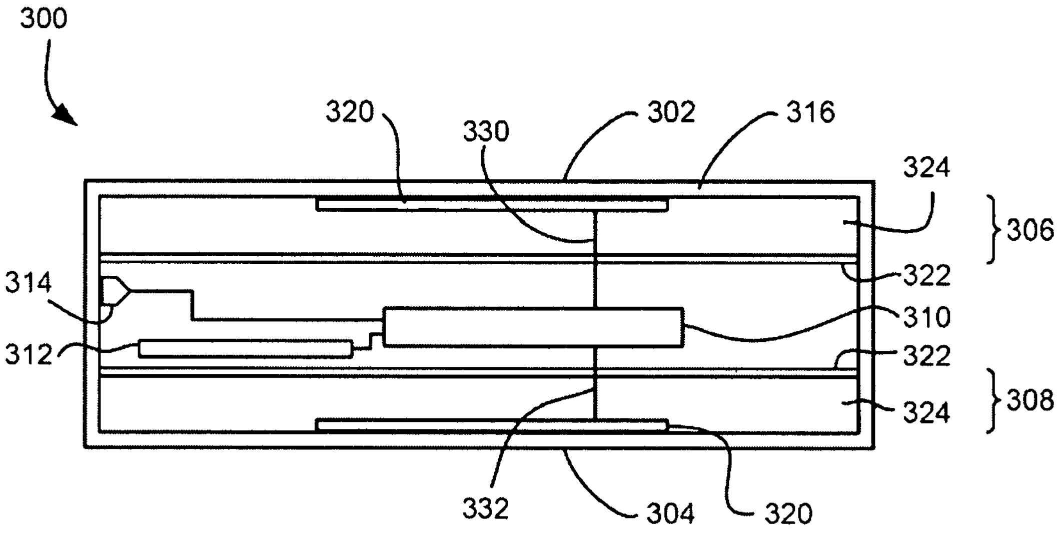
FIG. 3B is a cross sectional view of the RFID device of FIG. 3A taken along line 3B-3B of FIG. 3A.

FIGS. 3A and 3B illustrate an RFID device 300 such as an RFID tag according to one embodiment For simplicity, a device with two antennas is described. It should be noted that more than two antennas may be present. Further, each antenna may have more than one microstrip and/or more than one backplane. Accordingly, the present invention is not to be limited to the specific embodiments described herein. Also, layer thicknesses have been exaggerated for descriptive purposes.

With reference to FIGS. 3A and 3B, the device includes first and second sides 302, 304. The first and second sides 302, 304 may or may not lie along parallel planes. Several advantages of having sides lying along paralleled planes will soon become apparent.

A first microstrip antenna 306 of conventional materials extends along the first side 302, while a second microstrip antenna 308 of conventional materials extends along the second side 304.

Each microstrip antenna 306, 308 includes a microstrip 320, e.g., ground traces, positioned towards the respective side, an RF-reflective back plane 322 (also known as a ground plane), and a dielectric spacer 324 positioned between the microstrip 320 and the back plane 322. Illustrative materials for the microstrip 320 and back plane 322 include copper and other conductive metals. The shape of each microstrip 320 can be any suitable shape. Exemplary shapes include square, rectangular, spiral, coil, straight lines, bet lines, etc. The microstrip 320 may or may not extend to about the periphery of the tag.

During RF transmission, the signal resonates between the ground plane 322 and the traces. Microstrip antennas are typically directional, because the ground plane 322 reflects RF. This is particularly so where the microstrip antenna is configured as a patch antenna. Where the first and second sides lie along parallel planes, each microstrip antenna 306, 308 may provide coverage of the half space facing the antenna. The combined pattern of the two antennas 306, 308 provides a desirable omni-directional (isotripic) coverage in free space.

Also, the opposed configuration of the antennas 306, 308 reduces the probability of both antennas being detuned, especially where the antennas are impendent as described in more detail below. Particularly, placing the device on a metal or dielectric object (body, box, wall, etc.) may detune one antenna, but the other antenna will function adequately for communication, thus reducing the dependence of the tag delectabililty on mounting configuration.

Preferably, the two antennas 306, 308 do not see each other, i.e., one antenna is not significantly affected by the other antenna. To accomplish this, the backplane 322 of the first microstrip antenna 306 nearly completely isolates the first antenna 306 from an outgoing signal of the second antenna 308. The backplane 322 of the first microstrip antenna 306 may also isolate the second antenna 308 from an outgoing signal of the first antenna 306. Likewise, the backplane 322 of the second microstrip antenna 308 nay isolate the second antenna 308 from an outgoing signal of the first antenna 306. The backplane 322 of the second microstrip antenna 308 may also isolate the first antenna 306 from an outgoing signal of the second antenna 308. The isolation has the effect of preventing one antenna from interfering with the other. In one embodiment, the backplanes 322 of the microstrip antennas are continuous structures, and extend about to a periphery of the device (as shown) to maximize their shielding effects.

Circuitry 310 for receiving signals from the first and second microstrip antennas 306, 308 is also present, and may be embodied in a chip such as that described above in reference to FIG. 2. Preferably, the circuitry 310 and any other components such as a battery 312, sensor 314, etc. are positioned between the backplanes 322 of the microstrip antennas 306, 308. In this way, the antennas are shielded from the circuitry 310, battery 312, etc., and any interference caused thereby is avoided.

In a preferred embodiment, the two antennas 306, 308 operate independently from one another, i.e., are not coupled together, but rather are each independently coupled to the circuitry 310 via independent connections 330, 332, respectively. Thus, the circuitry 310 can receive and send signals via each antenna independently.

Preferably, the signals from the first and second microstrip antennas 306, 308 are not combined in RF, but rather after RF detection inside the circuitry 310. This allows the device 300 to process incoming signals, even if one of the antennas becomes detuned. e.g., because of proximity of an external RF-reflective surface. If one antenna detunes, the other antenna will not be affected since they are not connected together. To the circuitry 310, the detuned antenna may appear to have no discernable output. The antenna selection hardware may also take a switched approach where the antenna with the greatest signal is chosen.

In one embodiment, the signals from the first and second microstrip antennas 306, 308 may be combined at baseband. To enable this, the RFID chip or electronic device embodying the circuitry 310 has two independent antenna inputs, one for each of the microstrip antennas. Each antenna operates independently because the chip embodying the circuitry 310 has two independent inputs.

The resultant signals generated in the various antennas 306, 308 may be captured and rectified, and the rectified output of each may be combined at basebands. Whichever signal is highest will dominate at the envelope. Thus, this is another improvement over attempting to add the RF signals directly, as adding the RF signals directly will result in some orientation and/or frequency where there is a null or detuning of both antennas 306, 308.

An optional substantially RF-transparent covering 316, e.g., of plastic, paper, etc. may surround the device.

The device shown in FIG. 3A is particularly beneficial for UHF or higher frequency RFID application, though also find utility in lower frequency applications.

RFID devices constructed according to preferred embodiments provide several advantages:

1—If the device is placed on an object made of metal, high dielectric or lossy dielectric, the antenna facing the object (Antenna #1) will become detuned, but the performance of the other antenna located on the other side of the tag (Antenna #2) will not be affected, because of the existence of the ground plane. The ground plane isolates (Antenna #2) from the effect of the material facing Antenna #1. Such configurations widen the range of application of the RFID tag design and make it more tolerant to specific placements.

2—The ground plane associated with each antenna can be used as a shield to isolate other tag components from affecting the antenna RF performance. The components may include a battery (whether flat or not) other electronics such as RFID chip, sensors and connectors.

3—Where the antennas are independent, each one can cover an entire side of the tag, thereby each covering a half-space around the tag. This in turn provides near omni-directional (isotropic) capability in free space.

One skilled in the art will appreciate how the systems and methods presented herein can be applied to a plethora of scenarios and venues, including but not limited to automotive yards, warehouses, construction yards, retail stores, boxcars and trailers, etc. Accordingly, it should be understood that the systems and methods disclosed herein may be used with objects of any type and quantity.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) device, comprising:

first and second sides;

a first microstrip antenna extending along the first side, the first microstrip antenna comprising a microstrip positioned towards the first side, a Radio Frequency—(RF-) reflective back plane, and a dielectric spacer positioned between the microstrip and the back plane;

a second microstrip antenna extending along the second side, the second microstrip antenna comprising a microstrip positioned towards the second side, an RF-reflective back plane, and a dielectric spacer positioned between the microstrip of the second microstrip antenna and the back plane of the second microstrip antenna; and circuitry for receiving signals from the first and second microstrip antennas, wherein the first and second microstrip antennas are each independently coupled to the circuitry.

2. A device as recited in claim 1, wherein the first and second sides lie along parallel planes.

3. A device as recited in claim 1, wherein the circuitry is positioned between the backplanes of the microstrip antennas.

4. A device as recited in claim 1, further comprising a battery positioned between the backplanes of the microstrip antennas.

5. A device as recited in claim 1, wherein the backplanes of the microstrip antennas extend about to a periphery of the device.

6. A device as recited in claim 1, wherein each microstrip antenna is a patch antenna.

7. A device as recited in claim 1, wherein the signals from the first and second microstrip antennas are not combined in RF.

8. A device as recited in claim 7, wherein the signals from the first and second microstrip antennas are combined at baseband.

9. A device as recited in claim 1, wherein the device is an RFID tag.

10. A device as recited in claim 1, wherein the backplane of the first microstrip antenna isolates the first antenna from an outgoing signal of the second antenna.

11. A device as recited in claim 1, wherein the backplane of the first microstrip antenna isolates the second antenna from an outgoing signal of the first antenna.

12. A device as recited in claim 1, further comprising a sensor coupled to the circuitry.

13. A device as recited in claim 12, wherein the sensor is positioned between the backplanes of the microstrip antennas.

14. A Radio Frequency Identification (RFID) device, comprising:

first and second sides lying along parallel planes;

a first microstrip antenna extending along the first side, the first microstrip antenna comprising a microstrip positioned towards the first side, a Radio Frequency—(RF-) reflective back plane, and a dielectric spacer positioned between the microstrip and the back plane;

a second microstrip antenna extending along the second side, the second microstrip antenna comprising a microstrip positioned towards the second side, an RF-reflective back plane, and a dielectric spacer positioned between the microstrip of the second microstrip antenna and the back plane of the second microstrip antenna;

circuitry for receiving signals from the first and second microstrip antennas; and a battery coupled to the circuitry, wherein the first and second microstrip antennas are each independently coupled to the circuitry, wherein the circuitry is positioned between the backplanes of the microstrip antennas, wherein the battery is positioned between the backplanes of the microstrip antennas, wherein the signals from the first and second microstrip antennas are not combined in RF.

15. A device as recited in claim 14, wherein the backplanes of the microstrip antennas extend about to a periphery of the device.

16. A device as recited in claim 14, wherein each microstrip antenna is a patch antenna.

17. A device as recited in claim 14, wherein the signals from the first and second microstrip antennas are combined at baseband.

18. A device as recited in claim 14. wherein the device is an RFID tag.

19. A device as recited in claim 14, wherein the backplane of the first microstrip antenna isolates the first antenna from an outgoing signal of the second antenna.

20. A device as recited in claim 14, wherein the backplane of the first microstrip antenna isolates the second antenna from an outgoing signal of the first antenna.

21. A device as recited in claim 14, further comprising a sensor coupled to the circuitry.

22. A device as recited in claim 21, wherein the sensor is positioned between the backplanes of the microstrip antennas.

23. A Radio Frequency Identification (RFID) device, comprising:

first and second sides lying along parallel planes;

a first microstrip antenna extending a long the first side, the first microstrip antenna comprising a microstrip positioned towards the first side, a Radio Frequency—(RF-) reflective back plane, and a dielectric spacer positioned between the microstrip and the back plane;

a second microstrip antenna extending along the second side, the second microstrip antenna comprising a microstrip positioned towards the second side, an RF-reflective back plane, and a dielectric spacer positioned between the microstrip of the second microstrip antenna and the back plane of the second microstrip antenna;

circuitry for receiving signals from the first and second microstrip antennas;

a battery coupled to the circuitry; and a sensor coupled to the circuitry, wherein the first and second microstrip antennas are each independently coupled to the circuitry, wherein the signals from the first and second microstrip antennas are not combined in RF, wherein the circuitry is positioned between the backplanes of the microstrip antennas, wherein the battery is positioned between the backplanes of the microstrip antennas, wherein the sensor is positioned between the backplanes of the microstrip antennas.

* * * * *

UNITED STATES PATENT AND TRADEMARK OFFICE

CERTIFICATE OF CORRECTION

PATENT NO. : 7,561,107 B2

APPLICATION NO. : 11/470968

DATED : July 14, 2009

INVENTOR(S) : Al-Mahdawi

It is certified that error appears in the above-identified patent and that said Letters Patent is hereby corrected as shown below:

col. 1, line 17 change “scannner” to --scanner--;
col. 1, line 29 change “line-of-sigh” to --line-of-sight--;
col. 1, line 32 change “item’serial” to --item’s serial--;
col. 1, line 51 change “over come” to --overcome--;
col. 2, line 51 change “is” to --has--;
col. 3, line 3 change “understand” to --understanding--;
col. 3, line 44 change “and time” to --an item--;
col. 3, line 46 change “time” to--item--;
col. 3, line 53 change “and” to --an--;
col. 3, line 55 change “and” to --an--;
col. 4, line 5 change “exiting” to --existing--;
col. 4, line 22 change “time” to --item--;
col. 4, line 24 change “time” to --item--;
col. 4, line 29 change “to” to --do--;
col. 4, line 46 change “Complaint” to --compliant--;
col. 4, line 49 change “Identify” to --Identity--;
col. 4, line 49 change “mm” to --m--;
col. 4, line 57 change “gas” to --tags--;
col. 5, line 36 change “and” to --an--;
col. 6, line 19 change “reader” to --readers--;
col. 6, line 40 change “teaching” to --teachings--;
col. 6, line 51 change “write able” to --writeable--;
col. 6, line 58 change “embodiment For” to --embodiment. For--;
col. 7, line 2 change “paralleled” to --parallel--;
col. 7, line 17 change “bet” to --bent--;
col. 7, line 28 change “(isotripic)” to --(isotropic)--;
col. 7, line 46 change “nay” to --may--;
col. 8, line 8 change “detuned, e.g.,” to --detuned, e.g.--;
col. 8, line 24 change “output” to --outputs--;
col. 8, line 33 change “application” to --applications--;
col. 8, line 33 change “find” to --finds--;

In the claims:
col. 10, line 39 claim 23 change “a long” to --along--.

Signed and Sealed this

Twelfth Day of January, 2010

David J. Kappos
*Director of the United States Patent and Trademark Office*